United States Patent [19]

Liu

[11] Patent Number: 5,558,329
[45] Date of Patent: Sep. 24, 1996

[54] PHOTOELECTRIC DIGITIZED JOYSTICK

[76] Inventor: William S. Y. Liu, 3F, No. 19, Lane 190, Tun-Hwa S. Rd., Sec. 1, Taipei, Taiwan

[21] Appl. No.: 396,592

[22] Filed: Mar. 1, 1995

[51] Int. Cl.⁶ ................................................ A63F 9/00
[52] U.S. Cl. .................. 273/148 B; 345/156; 345/158; 345/161; 463/38
[58] Field of Search ............................. 273/148 B, 438; 345/156, 161, 158

[56] References Cited

U.S. PATENT DOCUMENTS

| | | | |
|---|---|---|---|
| 4,250,378 | 2/1981 | Mutton | 273/438 X |
| 4,994,669 | 2/1991 | Stern | 273/148 BX |
| 5,168,221 | 12/1992 | Houston | 345/161 X |
| 5,424,756 | 6/1995 | Ho et al. | 345/158 |

*Primary Examiner*—Raleigh W. Chiu
*Attorney, Agent, or Firm*—Ostrolenk, Faber, Gerb & Soffen, LLP

[57] ABSTRACT

A joystick including two light gratings respectively and fixedly mounted on an X-axle and a Y-axle, which are arranged at right angles to each other are movable by an operating stick. Each light grating has a series of apertures equally spaced along the periphery thereof. A light emitter and receiver assembly is disposed about said apertures in each said light grating to detect movement of the light grating, and a control circuit receiving signals from the light emitter and receiver assemblies provides a variable delay output signal corresponding to the movement of the operating stick.

6 Claims, 5 Drawing Sheets

PHOTOELECTRIC DIGITIZED JOYSTICK

BACKGROUND OF THE INVENTION

The present invention relates to joysticks, and more particularly, to a photoelectric digitized joystick with improved durability and accuracy of the joystick coordinates as the result of the use of light gratings instead of a variable resistor as used in conventional variable resistance type joysticks.

Various video game machines have been developed, and have been commercialized. When first developed, these video game machines were operated by keyboards. More recently, video game machines are typically operated by joysticks. FIGS. 1 and 2 respectively show the circuit diagram and operational time sequence of a variable resistance type joystick according to the prior art. The variable resistor VR1 of the joystick is connected to a control circuit of the computer. When the computer gives a triggering command, electric current passes through VR1 and R1 to charge C1. When the voltage of C1 reaches Vres, TR1 is discharged, and one triggering cycle is completed. When the operating stick of the joystick is moved to change the impedance of VR1, the charging time in which C1 is charged to Vres is relatively changed. The computer calculates the coordinates of the joystick according to the period of the resulting time delay. Since the accuracy of the time delay is determined subject to VR1, R1 and C1, errors tend to occur when these elements are affected by temperature. Furthermore, the variable resistor is also affected by wear with use, and therefore its service life is relatively short.

SUMMARY OF THE INVENTION

The present invention provides a photoelectric digitized joystick which eliminates the aforesaid drawbacks. According to the present invention, two light gratings, each with a series of apertures are fixedly mounted to an X-axle and the Y-axle respectively, and, are arranged at right angles to each other and are moved by an operating stick of the joystick. Two sets of light emitter and receiver assemblies are respectively disposed relative to the apertures on the light gratings to detect movement of the light gratings. When the X-axle and the Y-axle are moved by the operating stick, an integrated time base circuit receiver or signal is induced by the light emitter and receiver assemblies to provide a variable delay output corresponding to the movement of the operating stick.

DETAILED DESCRIPTION OF THE PREFERRED EMBODIMENT

Figure 1:
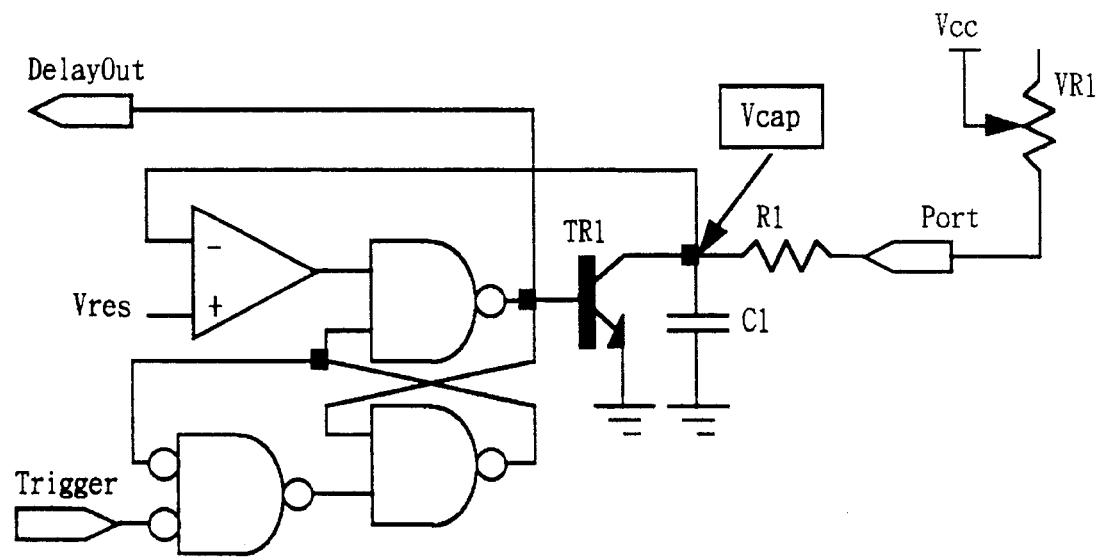
FIG. 1 is a circuit diagram of a conventional variable resistance type joystick.
Figure 2:
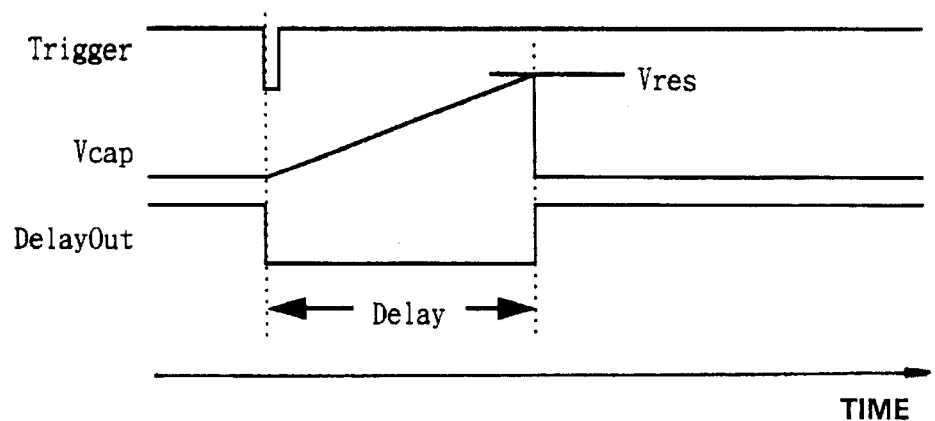
FIG. 2 is a time sequence chart showing the operation of the variable resistance type joystick shown in FIG. 1.
Figure 3:
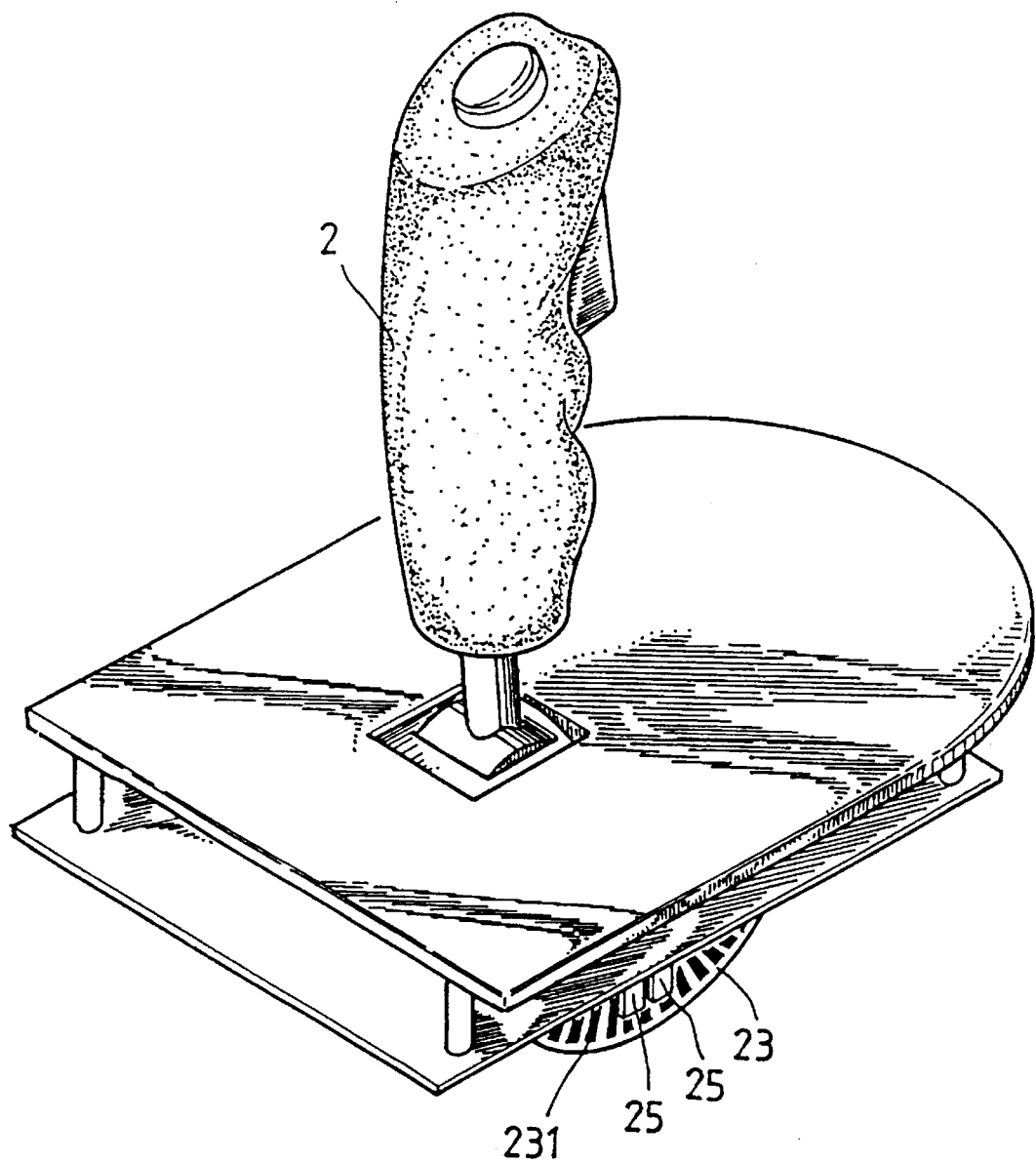
FIG. 3 is an elevational view of a photoelectric type digitized joystick according to the present invention.
Figure 4:
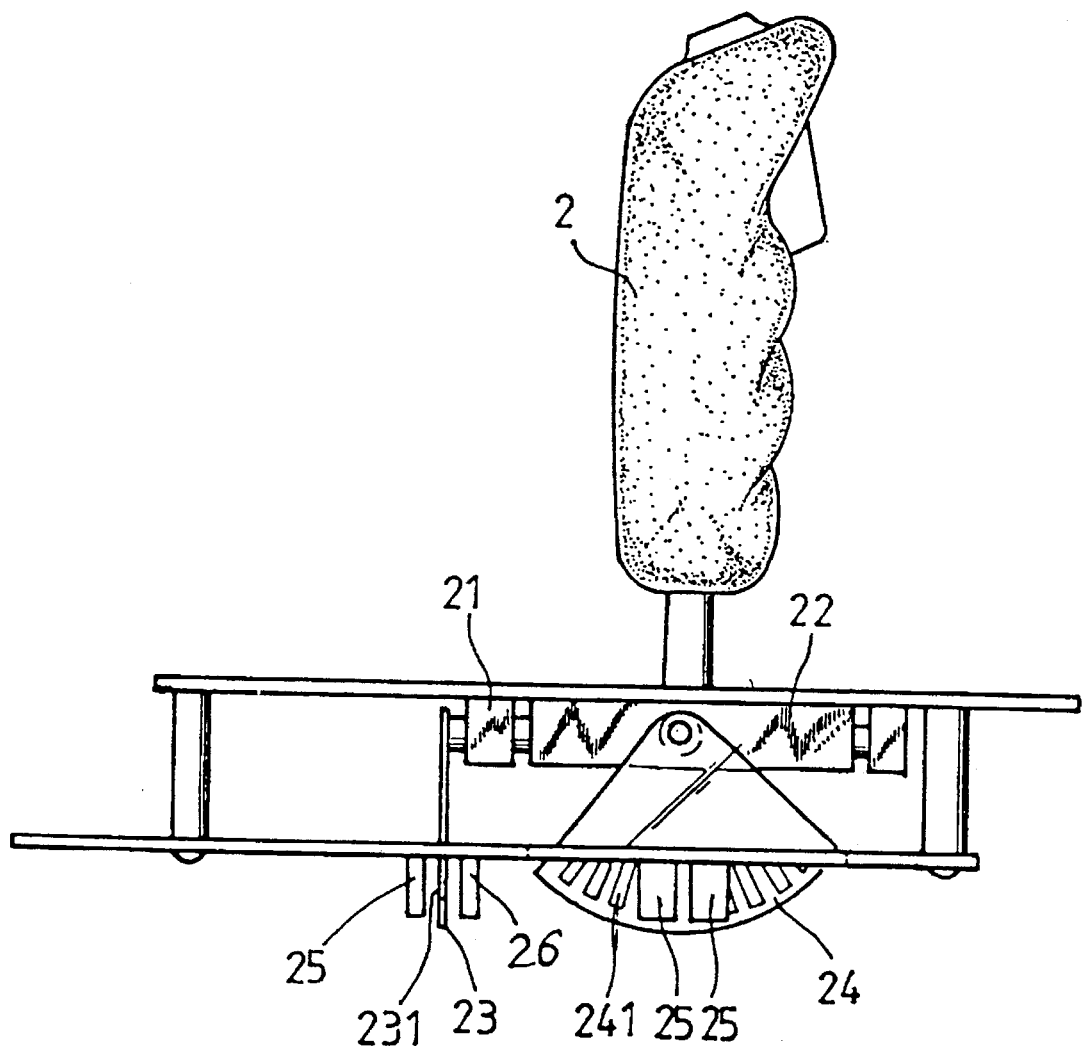
FIG. 4 is a perspective side view of the photoelectric type digitized joystick shown in FIG. 3.

Referring to FIGS. 3 and 4, light gratings 23 and 24 are respectively mounted on the X-axle 21 and Y-axle 22, respectively, and are disposed beneath the operating stick 2. Each light grating 23 or 24 respectively has a set of apertures 231 or 241 arranged along its periphery, with each light grating 23 and 24 being in the shape of a sector and having an arcuate edge. A set each of light emitting and receiving photoelectric elements 25 and 26 are respectively disposed on either side of the apertures 231 and 241. In other words, the light emitting photoelectric element 25 is positioned on one side of a light grating and the light receiving photoelectric element 26 is positioned on the other side. Thus, when the operating stick 2 is moved, the light gratings 23 and 24 are also moved, causing the photoelectric elements 25 and 26 to change their outputs and to send an output signal to the computer so that the computer can determine the coordinates of the operating stick 2.

Figure 5:
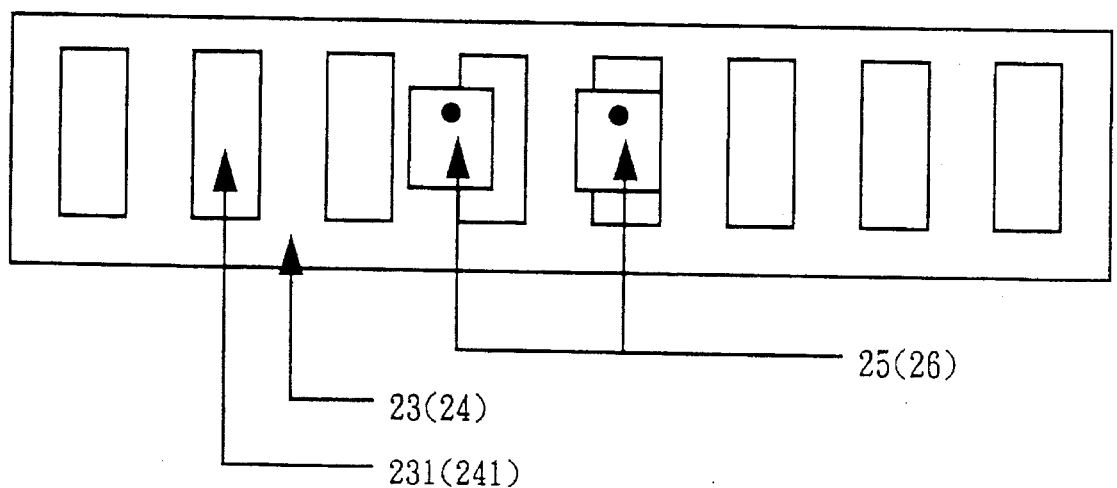
FIG. 5 is a plan view of a light chopper according to the present invention.

Referring to FIG. 5, the arrangement of the light chopping holes 231 or 241 on the light grating 23 or 24 are equally spaced from one another by a pitch equal to the width of the apertures 231 or 241 so that when the light gratings 23 or 24 are moved by the stick 2, the respective light emitting and receiving photoelectronic elements cause a variation in the output signal, which is detected by IC1 (FIG. 6) for measuring the position of the operating stick coordinates.

Figure 6:
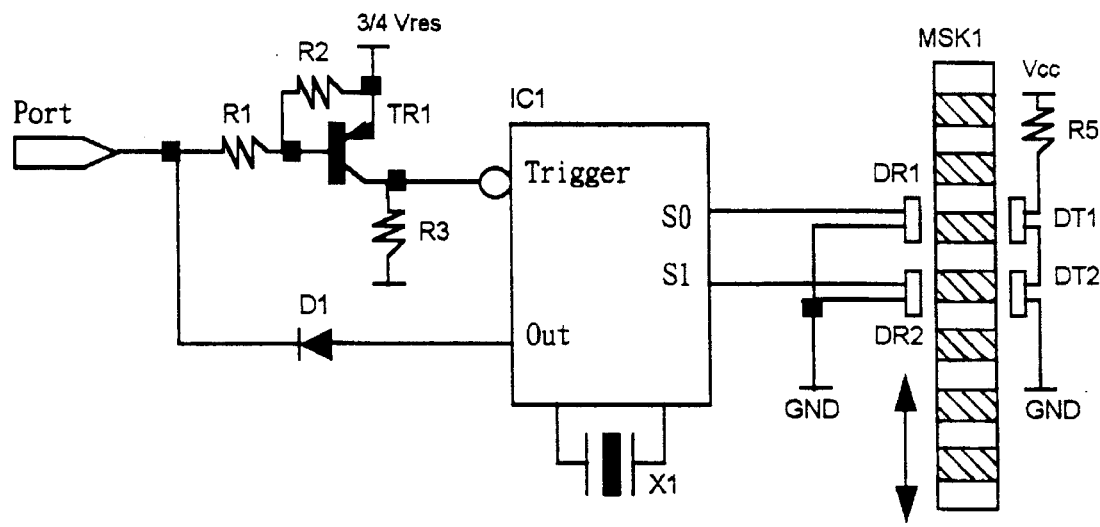
FIG. 6 is a circuit used with the photoelectric type digitized joystick shown in FIG. 3.
Figure 7:
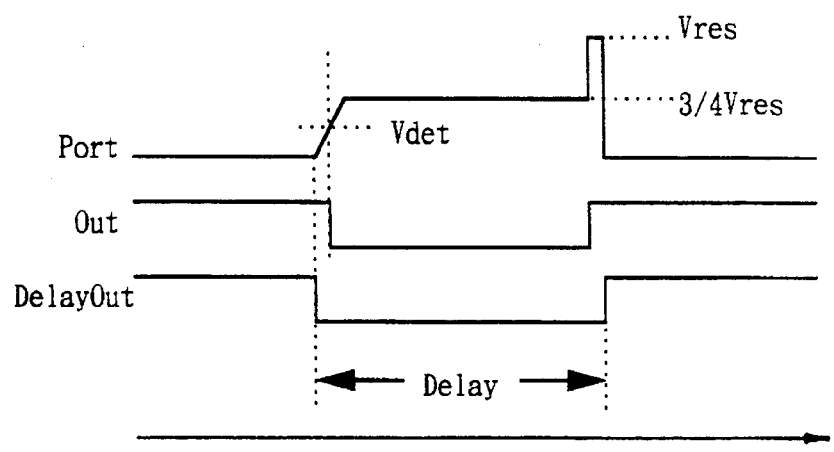
FIG. 7 is an operational time sequence chart according to the present invention.

FIG. 6 shows the circuits used with the photoelectric type digitized joystick of the present invention, and FIG. 7 is the operational time sequence of the photoelectric type digitized joystick. In FIG. 6, TR1, R1 and R3 form a voltage detecting circuit. When the computer gives a triggering signal, the voltage at Port is increasing from zero volts. When the voltage at Port reaches Vdet (the level at which the voltage detection passes), it immediately triggers IC1, causing IC1 to convert the signal from S0 to S1 into a coordinate signal for further frequency division. When the delay time corresponding to that of the resistance capacitance is up, the OUT terminal outputs a voltage Vcc, and a digitized frequency division of a single-triggering time delay cycle is completed. The accuracy of this time delay cycle is subject to the accuracy of the circulation X1 (quartz crystal, ceramic oscillator, or any oscillator more accurate than ceramic capacitors). Therefore, the accuracy of the coordinate signal is greatly improved. In the circuit, DT1 and DT2 are light emitters, DR1 and DR2 are light receivers. When the light chopping holes 231 and 241 are moved, the outputs of DR1 and DR2 are changed, and therefore IC1 receives the corresponding coordinate value according to the following equations:

S0mem=S0 history memory

S1mem=S1 history memory

S0=feedback signal from receiver DR1

S1=feedback signal from receiver DR2

S0chg=S0mem+S0

S1chg=S1mem+S1

Enable=S0chg+S1chg

Direction=(S0mem ⊕ S1mem) ⊕ S0chg

Increment=Enable & (Direction=0)

Decrement=Enable & (Direction=1)

[⊕ is Exclusive or Gate]

The values of Increment and Decrement thus obtained are the increasing and decreasing amount of movement on the coordinates.

It is to be understood that the drawings are designed for the purposes of illustration only, and are not intended as a definition of the limits and scope of the invention disclosed.

What is claimed is:

1. A joystick comprising: an operating stick, light gratings fixedly mounted on an X-axle and a Y-axle, said X-axle and Y-axle are substantially arranged at right angles to each other and are movable by said operating stick, each light grating including a series of apertures spaced along a periphery thereof, and light emitter and receiver assemblies, each assembly disposed relative a light grating to cooperate with the apertures of said light grating, and a control circuit adapted for receiving a signal from said light emitter and receiver assemblies to provide a variable delay output corresponding to the movement of the light gratings and thereby said operating stick.

2. The joystick of claim 1 wherein said control circuit is a single-triggering circuit including a time base circuit.

3. The joystick of claim 1, wherein each light emitter and receiver assembly includes a light emitter disposed on one side of the series of apertures of one of the light gratings and a light receiver on the opposite side thereof.

4. The joystick of claim 1, wherein said apertures are equally spaced from leach other by a pitch equal to a width of said apertures.

5. The joystick of claim 1, wherein light gratings are each in the shape of a sector and having an arcuate edge.

6. The joystick of claim 5, wherein said series of apertures are in the vicinity of the arcuate edge of each of the light gratings.

* * * * *